United States Patent [19]

Busboom et al.

[11] Patent Number: 5,485,570

[45] Date of Patent: Jan. 16, 1996

[54] DISPLAY STATION CONTROLLER

[75] Inventors: Leah J. H. Busboom; Trent L. Clausen, both of Oronoco; Stephen T. Eagen, Rochester; Harvey G. Kiel, Rochester; Robert J. Manulik, Rochester; Michael E. Plute, Rochester; Jeffrey E. Remfert, Rochester; Raymond F. Romon, Oronoco, all of Minn.

[73] Assignee: International Business Machines Corporation, Armonk, N.Y.

[21] Appl. No.: 267,322

[22] Filed: Jun. 28, 1994

Related U.S. Application Data

[63] Continuation of Ser. No. 662,092, Feb. 28, 1991, abandoned.

[51] Int. Cl.⁶ .................................................. G06F 15/00
[52] U.S. Cl. ................................................................ 395/161
[58] Field of Search .................................... 395/162, 163, 395/155, 161, 156; 345/25, 27

[56] References Cited

U.S. PATENT DOCUMENTS

| | | | |
|---|---|---|---|
| 4,204,206 | 5/1980 | Bakula et al. | 364/200 |
| 4,204,521 | 5/1980 | Mattson | 364/900 |
| 4,641,262 | 2/1987 | Bryan et al. | 364/200 |
| 4,646,235 | 2/1987 | Hirosawa et al. | 340/717 |
| 4,665,501 | 5/1987 | Saldin et al. | 364/518 |
| 4,724,521 | 2/1988 | Carron et al. | 364/906 |
| 4,733,351 | 3/1988 | Peirent | 340/717 |
| 4,734,853 | 3/1988 | Nakano | 364/518 |
| 4,782,442 | 11/1988 | Kojima et al. | 364/900 |
| 4,791,566 | 12/1988 | Sudama et al. | 364/521 |
| 4,851,994 | 7/1989 | Toda et al. | 364/900 |
| 4,868,782 | 10/1989 | Lawrence et al. | 364/518 |
| 4,901,223 | 2/1990 | Rhyne | 364/200 |
| 4,910,704 | 3/1990 | Gemma | 364/900 |
| 4,949,254 | 8/1990 | Shorter | 364/200 |

FOREIGN PATENT DOCUMENTS

| | | |
|---|---|---|
| 0182097 | 5/1986 | European Pat. Off. . |
| 0458715 | 11/1991 | European Pat. Off. . |
| WO92/01263 | 1/1992 | WIPO . |

OTHER PUBLICATIONS

34th IEEE Computer Society International Conference, "Designing User Interface Tools For the X Window System", Scott McGregor, Senior Consulting Engineer, DECwindows architect, pp. 243–246, 1989.

"Hostlink," IBM Technical Disclosure Bulletin, vol. 32, No. 5A, Oct. 1989, pp. 317–318.

"Initiating PC Applications from a Host System," IBM Technical Disclosure Bulletin, vol. 31, No. 6, Nov. 1988, pp. 34–37.

"Display Interface converter for an Intelligent Workstation," IBM Technical Disclosure Bulletin, vol. 31, No. 6, Nov., 1988, pp. 60–61.

"IBM Personal Computer Local/Remote Display and Keyboard Sharing," IBM Technical Disclosure Bulletin, vol. 27, No. 3, Aug., 1984.

"Built–in Processor for Interface of Graphics Workstations, "0 IBM Technical Disclosure Bulletin, vol. 28, No. 12, May, 1986.

"Addition of an Industry–Standard Personal–Computing Capability to a Host–Attached Terminal," IBM Technical Disclosure Bulletin, vol. 28, No. 3, Aug., 1985, pp. 978–990.

"Xlib Programming Manual for Version II," The Definitive Guides to the X Window System, vol. 1, by Adrian Nye, O'Reilly & Associates, Inc., 1989.

Primary Examiner—Phu K. Nguyen
Attorney, Agent, or Firm—Kenneth C. Hill; Andrew J. Dillon

[57] ABSTRACT

A system for supporting graphics display sessions on remote terminals contains a processing subsystem dedicated to graphics support. Applications execute on a central processor, and display related graphics commands are executed on the separate graphics controller subsystem. The graphics subsystem is preferably connected to multiple remote terminals over a network, and communicates with them without requiring all work to be performed by the central processor which is executing the applications.

16 Claims, 2 Drawing Sheets

DISPLAY STATION CONTROLLER

This is a continuation, of application Ser. No. 07/662,092, filed Feb. 28, 1991, now abandoned.

BACKGROUND OF THE INVENTION

1. Field of the Invention

The present invention relates generally to electronic computer systems, and more specifically to a system and method for controlling graphics displays for computer systems.

2. Description of the Prior Art

Graphical user interfaces are becoming increasingly common in the computer industry. These interfaces typically use various types of images and graphics to convey information to users more quickly and clearly than text based interfaces. Many such interfaces allow multiple, often overlapping, windows representing separate applications or separate parts of the same application, allowing a user to monitor the activities of several programs at once.

Driving such graphical interfaces places heavy demands on the processors involved. In addition to the fact that several applications are often running simultaneously, the use of overlapping windows means that display subsystems must constantly monitor those portions of each window which are visible to the user. Manipulation of bit mapped graphics on a high resolution display, often in color, requires a large number of processor cycles even for relatively simple tasks. As a result, high performance processors are required to control complex graphics displays.

Systems which are not specifically designed to support high resolution graphical displays can suffer performance degradation when driving such displays. This becomes especially true when such systems are required to support multiple displays simultaneously. The amount of processing required simply to support basic functions on multiple graphical displays simultaneously can tax the resources of even a high performance processor, leaving little or no time for the execution of basic processing functions. This greatly degrades the overall performance of such systems.

In order to increase programmer productivity and portability of applications, numerous graphical display interfaces are in the process of being standardized. One increasingly popular graphical display standard is known as X Windows. X Windows has initially been implemented on UNIX(tm) and compatible operating systems. As such, X Windows is designed to be highly portable across computer systems having widely different architectures and different manufacturers.

X Windows is defined so as to be easily implemented over a local area network. This allows applications to execute on one machine, while the graphical user interface runs on a separate, physically remote, machine or terminal. The formal definition of the X Windows system changes from time to time under the control of an association of major computer manufacturers who support the X standard. Literature describing the X Windows system and its implementations is voluminous, and one document which explains the X Windows environment is *X WindowSystem*, 2d edition, R. W. Scheifler and J. Gettys, Digital Press, 1990.

X Windows works well with a network of full featured, high performance graphical work stations which have their own operating systems and can run applications. This is, in fact, the environment for which it was designed. An alternative system which could make good use of the graphical X Windows interface would be one which has a large central system, and relatively simple graphical terminals connected to the central system over a network. This arrangement concentrates much of the processing power in one location, and allows additional users to be added to the network for a relatively small incremental cost. Once the system is in place, the incremental cost for adding a user is much less than that for providing each new user with a fully featured graphical work station.

One important drawback to the use of a central system is that the processing demand on the main central system is quite high due to the large number of graphical terminals which are supported. In addition to the burden of executing a larger number of application programs simultaneously, a heavy processing burden must be carried by the central system simply to support the X Windows graphical interface for the terminals. If more than a very small number of graphical terminals are executing simultaneously using the resources of a main central processor, overall performance of such a processor can be severely degraded.

A single central system driving a number of terminals over a network could be a cost effective alternative to a network of fully featured work stations. However, such a system will only be feasible if the needed performance can be achieved. Such a centralized system is quite flexible, since fully featured work stations can be attached to the network as well as graphical terminals.

It would therefore be desirable to provide a system capable of supporting multiple graphic sessions on remote terminals or other devices over a network. It would be further desirable for such a system to be compatible with X Windows or a similar widely available standard interface. It is highly desirable that such a system provide acceptable performance while driving a relatively large number of graphical terminals.

SUMMARY OF THE INVENTION

It is therefore an object of the present invention to provide a system for supporting multiple graphics sessions on remote (network attached) terminals.

It is another object of the present invention to provide such a system which is compatible with the X Windows interface standard.

It is a further object of the present invention to provide such a system which provides good performance for a relatively large number of multiple, simultaneous remote sessions.

Therefore, according to the present invention, a system for supporting graphics display sessions on remote terminals contains a processing subsystem dedicated to graphics support. Applications execute on a central processor, and display related graphics commands are executed on the separate graphics controller subsystem. The graphics subsystem is preferably connected to multiple remote terminals over a network, and communicates with them without requiring all work to be performed by the central processor which is executing the applications.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

The preferred embodiment of the invention will be described herein in conjunction with a particular implementation which utilizes the X Windows graphical display standard. It will be appreciated by those skilled in the art that the teachings of the invention can be adapted for use with other display systems having similar requirements.

Figure 1:
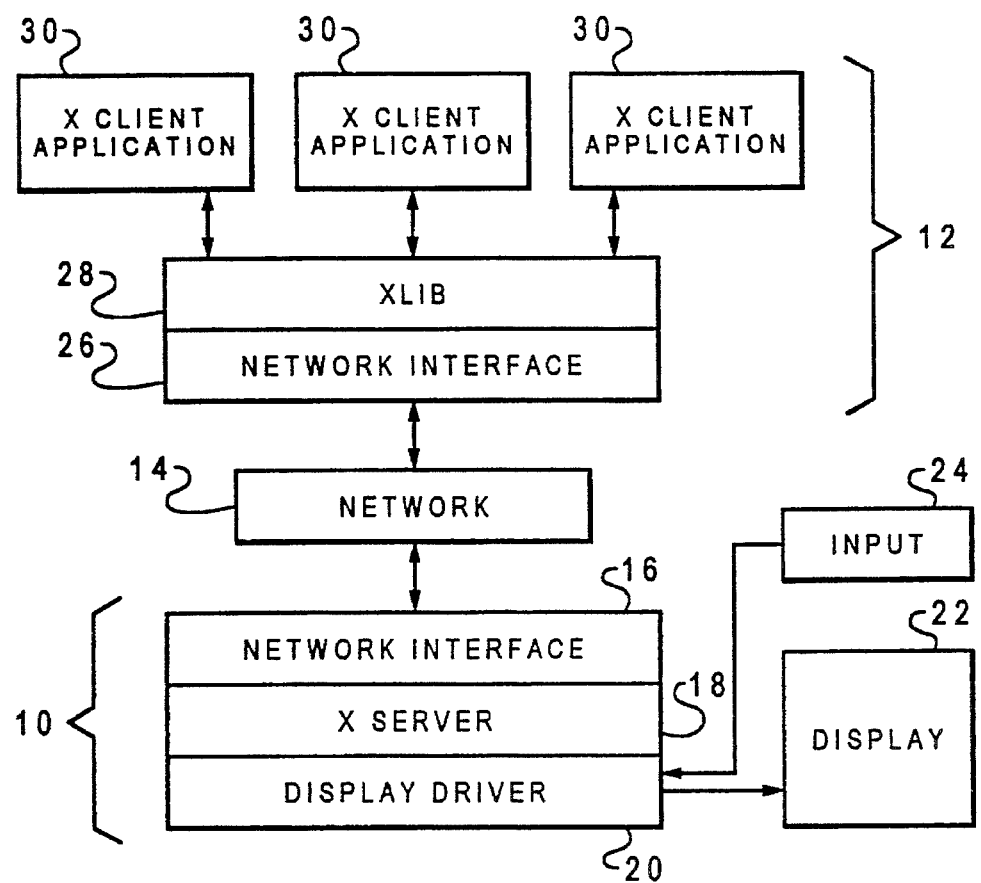
FIG. 1 is a block diagram illustrating a client/server model for a graphical interface.

FIG. 1 is a block diagram illustrating the client/server model utilized by X Windows. This model includes two main pieces: an X display station 10 and a host system 12. The X display station 10 and the host system 12 are connected through a network 14.

The precise type of network 14 used does not form a part of the present invention. The network 14 can be, for example, an Ethernet connection running TCP/IP. However, networks using other networking protocols, such as System Network Architecture (SNA) or Open Systems Connection (OSI), and other communications protocols, such as Token Ring LAN, or Integrated Systems Digital Network (ISDN), may also be used.

The X display station 10 includes a network interface 16 connected to the network 14. An X server 18 is connected to the network interface 16 and to a display driver 20. The display driver 20 in turn drives a visual display 22. The display station 20 can be any form of display device which supports X Windows. Examples of stations which are suitable for this task include UNIX(tm) workstations, dedicated X terminals, and X emulators running on other types of computers.

The X server 18 is software or firmware which can execute on a full featured work station, or on a dependent terminal, which may be programmable. Descriptions of the performance and functions of the X server 18 are widely available, and the specifics do not form a part of the present invention. In general, the X server 18 interprets requests transmitted over the network 14 through the network interface 16, and causes the display driver 20 to generate output on the display 22. The X server 18 also receives inputs from one or more input devices 24 through the display driver 20.

The functions of the X server 18 are well defined and constant over all types of X display stations 10. The display driver 20 is specific to the hardware of the display station 10, and interfaces directly with the display 22 and the input devices 24. Display 22 typically includes an all points addressable, raster video monitor, and input devices 24 include a keyboard and a pointing device such as a mouse. When the display driver 20 detects an input event, such as a key hit or a mouse movement, the X server 18 may generate a message to be transmitted over the network. Messages may also be generated by the X server 18 in response to some types of requests received from the network.

The host system 12 resides at the other end of the network link. Host system 12 is shown in FIG. 1 as being a single system, but it may actually consist of multiple separate systems communicating with the same display station 10 over the network 14. An important function of the X server 18 is to make and maintain network communications links with the one or more host systems 12.

Assuming a single host system, the network attachment hardware is controlled by a network interface 26. The network interface 26 communicates with Xlib 28 which is a library of relatively low level routines. Xlib 28 is defined in detail as part of the X Windows specification, and may be extended if desired.

A plurality of applications 30 communicate with Xlib 28 through procedure calls. These applications 30 are referred to in the X Windows system as "clients." These clients are the actual applications, such as word processors, computer aided design programs, and spread sheets, which are executed on a computer system. All input and output by the client applications 30 to a human user is preferably performed directly or indirectly through the Xlib 28 procedure calls. Output generated by an application 30 is transmitted by Xlib 28 through the network 14 to the X server 18, with input generated from an input device 24 travelling in the opposite direction. The combination of the Xlib 28 and X server 18 routines handles nearly all of the low level details of the display, with the client applications 30 being freed to perform their primary function without consideration of display details.

In most situations, the applications 30 do not interface directly with Xlib 28, but rather use tool kits (not shown) which provide a high level interface with the applications. The tool kits, in their turn, make calls to the Xlib 28 routines. In providing a high level interface to applications, the tool kits can require a large amount of processor performance. Standard tool kits are made available to applications writers in order to simplify their task, but they appear to the X Windows System as merely another part of the client applications 30.

A considerable amount of processing may be performed within the Xlib 28 routines. Xlib 28 handles drawing of graphics figures, and initiation and maintenance of network communications with the display system 10. A large number of routines in Xlib 28 are dedicated to the management of windows, including such considerations as display of overlapping windows, exposure events, and window movement across the display. As is well known in the art, these kinds of display processing require significant amounts of processor effort.

Image processing of various types is often performed in X Windows environments. This type of processing is well known to be highly processor intensive. Bit mapped images can be scanned into a file, or an image file can be created by an application. Various types of manipulation, such as image rotation and scaling, can be performed on the images. Image compression and decompression can be done to decrease storage requirements for the image files. This processing is often performed in tool kit routines which are callable by various application programs. It is well known that this type of processing also requires significant amounts of processor time.

Although it is not required, one of the client applications 30 typically is a window manager program. When used, the window manager client handles many details of window positioning and sizing, and movement of windows on the display. The window manager client utilizes many of the window management routines within Xlib 28.

Figure 2:
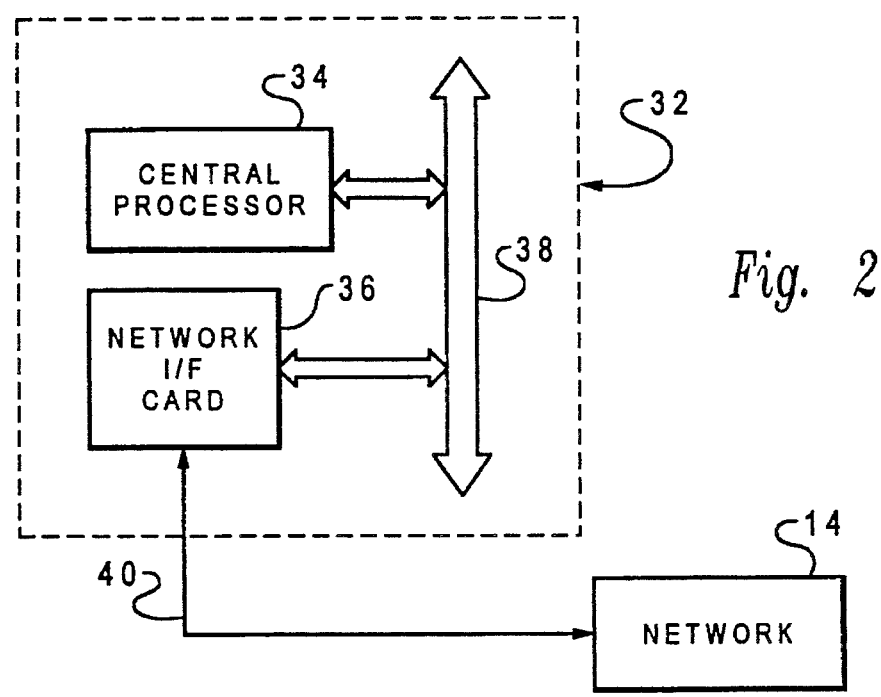
FIG. 2 is a high level block diagram of a central computer system similar to prior art systems which performs graphical display related processing in a central processor.

FIG. 2 illustrates a computer system such as is typically found in the prior art. The computer system 32 includes a central processor 34 and a network interface card 36. Both are connected to a system bus 38, which also connects other subsystems typically found in a computer system, such as input/output devices, memory, and mass storage (not shown). Network interface card 36 makes physical connection with a communications link 40, which in turn connects to the network 14.

The problems caused by the large processing requirements of Xlib 28 are easily understood with reference to the computer system 32. Central processor 34 must execute all of the Xlib procedures as well as the client applications 30. Whenever communications must be made to or from the network 14, the Network interface card 36 handles the low level details of such transfer. However, every data transfer in either direction must ultimately be handled by the central processor 34.

Since the Xlib procedures are known to be processor intensive, it will be appreciated that the overall system performance of processor 34 will be greatly degraded. The amount of degradation may, in fact, not be a problem in systems which are executing a relatively small number of tasks. However, if system 32 is being used as a central system, with many client applications 30 executing thereon, system performance will be low and system response time will be long. Thus, the use of a processor intensive graphics system such as X Windows is seen to work poorly in an arrangement wherein a single central system supports a large number of simple terminals.

Figure 3:
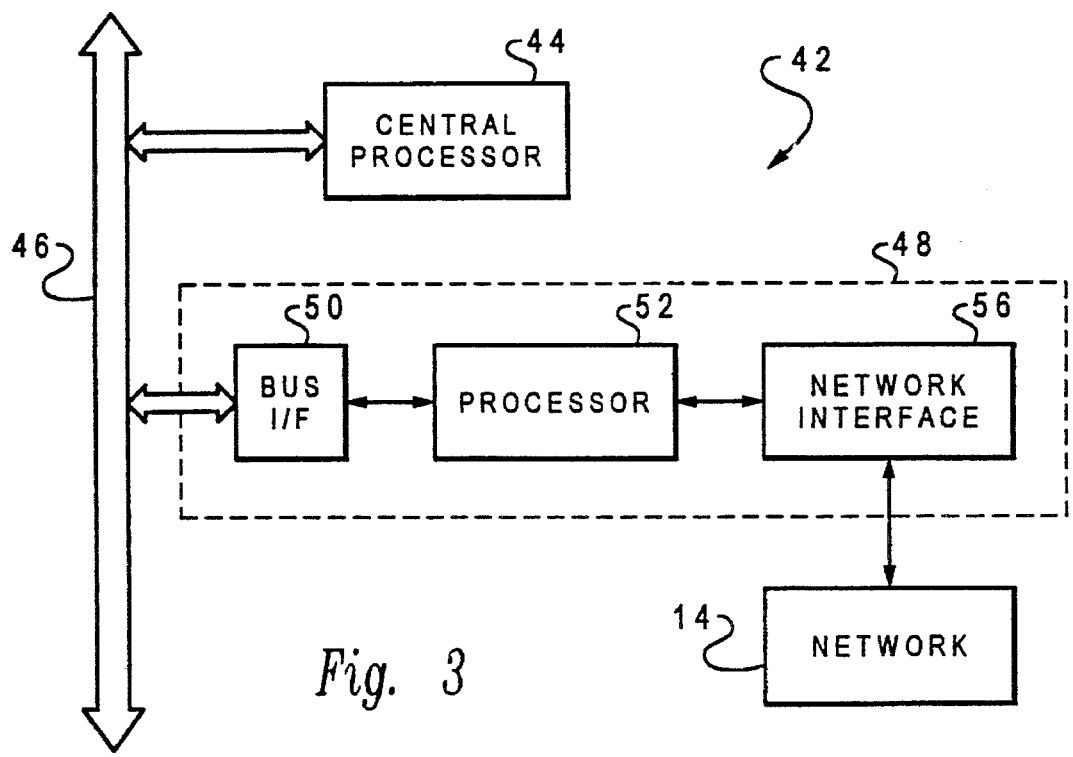
FIG. 3 is a block diagram of a preferred embodiment of a processing system according to the present invention.

FIG. 3 illustrates a preferred computer system which incorporates teachings of the present invention. The system 42 includes a central processor 44 which executes client applications 30 as described above. Central processor 44 is connected to the remainder of the system, including subsystems which are not illustrated, through system bus 46.

A secondary processor 48 is also connected to the system bus 46, and provides a link to the network 14. Secondary processor 48 actually contains a full featured, programmable computer system within itself. The secondary processor 48 contains a bus interface 50 to the system bus 46, and a processor 52. Also included is a network interface 56. Additional features found in full featured computer systems are also included but not shown, including items such as a read only store, random access memory, control and timing circuitry, and optional mass storage.

The processor 52 is preferably a full featured general purpose microprocessor. For example, secondary processor 48 can be designed around an i960 microprocessor, available from Intel. Additional co-processors (not shown), such as numeric co-processors or digital signal processors, are preferably included within the secondary processor 48 to improve the performance of number intensive graphics functions. The processor 52, alone or in combination with any such co-processors, may very well have more raw computing power than the system central processor 44. This allows the secondary processor 48 to execute a large number of processor intensive software, such as the Xlib library 28, which are required only for driving the X Windows displays. This frees the central processor 44 to execute the client applications 30, a job for which it may be much more highly suited.

System 42 can be implemented, for example, in an AS/400 computer available from IBM. The central processor of an AS/400 is well suited to multi-tasking of applications, but its efficiency at executing graphics intensive applications is somewhat less. The AS/400 is designed to function as a multi-processor system, so the use of a secondary processor 48 is a natural extension to the basic system.

Figure 4:
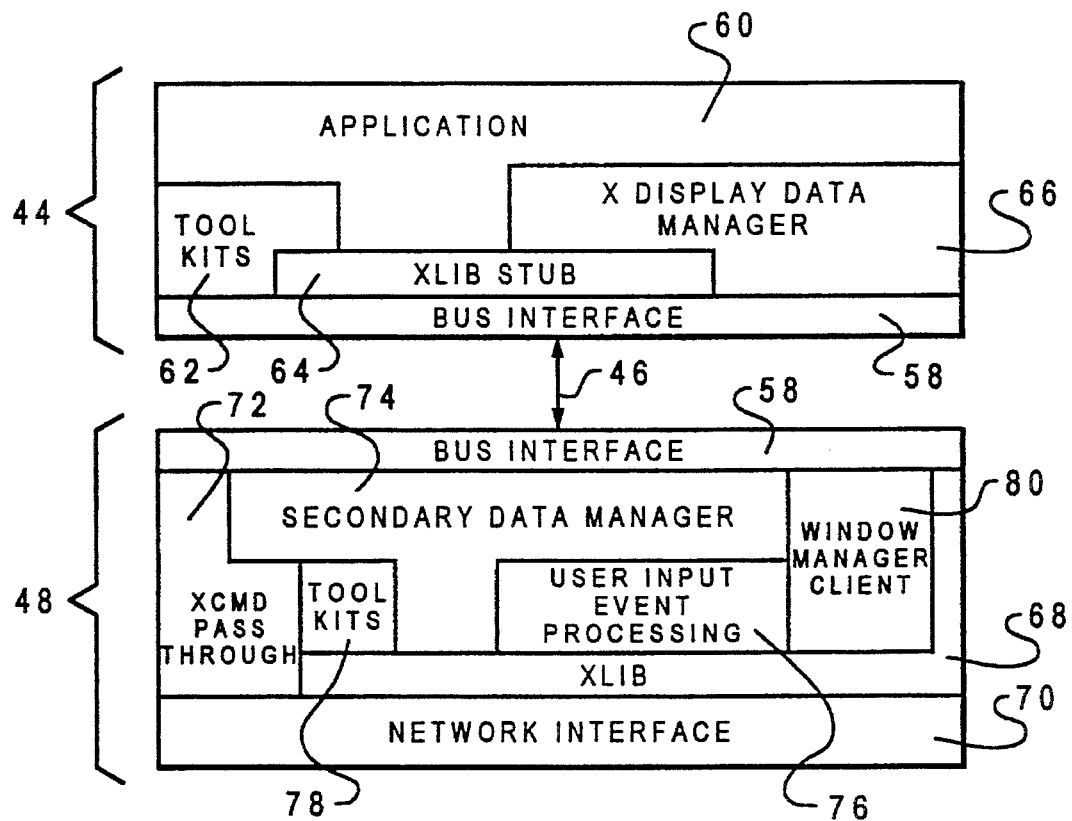
FIG. 4 is a block/dataflow diagram illustrating a software system preferably used in conjunction with the processor of FIG. 3.

FIG. 4 illustrates the structural relationships between the various software packages executing on the central processor 44 and the secondary processor 48. Each processor 44, 48 has a bus interface 58 for handling the transfer of data between the central processor 44 and the secondary processor 48. As is known in the art, the bus interfaces 58 may have significant portions implemented in hardware. The nature of the bus interfaces 58 do not form a part of the present invention, and will be dictated by the hardware used to implement the computer system 42.

The structure diagram of FIG. 4 is of a type known in the art, and is read in the usual manner. Each labelled block represents a software package. Data is communicated vertically between adjacent blocks using procedure calls and returns, or by an alternative method.

An application 60 executes on the central processor 44. All X Windows related input and output performed by the application 60 is performed by making the appropriate procedure calls to a tool kit 62, an Xlib stub 64, or an X display data manager 66. Other types of input and output, such as to files stored on mass storage devices, is handled using techniques known in the art.

The Xlib stub 64 takes the place of Xlib and appears to the calling application 60 exactly as Xlib 28. Instead of actually performing any Xlib routines in the Xlib stub 64, the procedure calls are simply passed through to the bus interface 58, for execution in the secondary processor 48. The procedure calls may be reformatted if desired to enhance the efficiency of the data transfer over the system bus 46. When an Xlib call is supposed to generate a returned result, any returned results will be transferred to the Xlib stub 64 over the system bus 46. Any necessary reformatting is performed by the stub 64, and returned to the application 60 in the normal manner. Thus, the intensive processing normally performed in Xlib is not performed on the central processor 44.

The tool kits 62 may be used in two different ways. A large number of tool kits are presently available in the art, and are used to provide a wide array of standardized and desirable program interfaces. These tool kits 62 implement oft used procedures once, and free the application programmer from having to rewrite code which is common to many applications. The tool kits 62 will, in their turn, call Xlib routines 64, or may communicate information to a tool kit executing on the secondary processor. As shown in FIG. 4, the tool kits 62 make Xlib procedure calls by calling the Xlib stub 64, or communicate directly to lower levels by communicating data directly to the bus interface 58.

As mentioned above, the tool kits 62 may be handled in two ways. One is for the tool kit to actually execute on the central processor 44. The other technique is to merely provide a stub to a tool kit executing on the secondary processor, similar in function to the Xlib stub 64. In this case, the actual execution of the tool kit code is performed on the secondary processor 48. The latter approach has the advantage of removing additional processing load from the central processor 44. Having tool kits execute on the secondary processor 48 is especially advantageous for those which perform image processing, due to the processor intensive nature of such work. For various implementation reasons, it may be desirable to have some of the tool kits 62 actually execute on the central processor 44, with others executing on the secondary processor 48 and being represented in the central processor 44 merely by stubs.

The X display data manager 66 is an applications program interface (API) which can be called by the application 60. The X display data manager 66 is similar to a tool kit 62, but preferably provides higher level functions. Instead of responding to single characters, it preferably communicates using larger blocks of data. The data manager 66 preferably allows an application to define display panels. The definition includes input field specifications, output areas, graphics interfaces, and similar features. In response to calls from the application 60, the display data manager 66 builds and sends data streams to the secondary processor 48 which define entry fields on the display panels, or requests screen or input field data. In return, the display data manager 66 receives data streams from the secondary processor 44 and processes them for return to the application 60. These returning data streams include such functions as returning input field data and processing special keyboard functions such as Help.

The concept of data streams transmitting large quantities of information is known in the art, and an example of a display data manager which functions in a similar manner to X display data manager 66 is described in *Application System/400 Programming: Data Description Specifications Reference* (DDS), available from IBM. The display data stream used in the AS/400 DDS display data manager is the 5250 data stream, described in IBM publication IBM 5250 Information Display System Functions Reference Manual.

Instead of, or in addition to, the use of data streams to communicate information with the secondary processor 48, the X display data manager 66 can make standard Xlib procedure calls to the Xlib stub 64. These procedure calls are handled in an identical manner to those which are made to Xlib by the tool kits 62, or directly by the application 60.

The software applications which are executed in the secondary processor 48 are shown in the lower portion of FIG. 4. The Xlib library 68 actually executes on the secondary processor 48, and communicates with the network interface 70. The Xlib routine 68 may be called directly by the Xlib stub 64 through the bus interfaces 58, or from various applications executing on the secondary processor 48.

As is known in the art, certain X commands pass through Xlib, directly between an application and the X server 18. Commands of this type, which are specially signalled by the applications and the X server 18, pass through 72 the Xlib library 68 and are communicated directly between the network interface 70 and the bus interface 58.

A secondary data manager 74 executes on the secondary processor 48, and interfaces with the X display data manager 66. The secondary data manager 74 processes data streams received from the display data manager 66. It also builds data streams which are sent to the display data manager 66 when specific keys are pressed on the X display station 10, such as the enter key, or when a response is requested by the display data manager 66. If a 5250 data stream communication is used as described above, the secondary data manager 74 must perform a conversion between the 5250 data stream format and X data formats.

The secondary data manager 74 makes procedure calls to Xlib 68 to communicate with the X display station 10. A user input event processing application 76 processes input events returned from the display station 10 over the network 14. Such input events include, for example, individual keystrokes made at a keyboard. When a special key, such as the enter key, is pressed, the secondary data manager 74 generates a data stream to be returned to the display data manager 66. This means that the central processor 44 does not perform any execution of the application 60 until an input sequence is completed, with the secondary processor 48 handling all of the network traffic involved in dealing with each keystroke individually. The input event processing application 76 also preferably deals with input from the mouse or other pointing device until an event such as a mouse button click occurs which requires the attention of the secondary data manager 74 or the application 60.

As described above, some tool kits 78 may be implemented so as to actually execute on the secondary processor 48 if desired. These tool kits 78 may be invoked by stubs running on the central processor 44, or may be invoked directly by the secondary data manager 74 or any other application running directly on the secondary processor 48. Tool kits 78 which perform image processing, such as image decompression, scaling, and image manipulation, are well suited for executing on the secondary processor 48 because of their heavy demands on the processor.

As described above, the window manager is a special client application which can be used to control the windows of multiple other client applications. Execution of the window manager is processor intensive. The window manager client 80 may be executed on the secondary processor 48, relieving the central processor 44 of all of the burden of executing the window manager. The window manager client 80 is a registered window manager within the X Windows system, and makes procedure calls to Xlib 68 to communicate with the X server 18. Since execution of the window manager client 80 is processor intensive, offloading it entirely to the secondary processor 48 greatly relieves the burden on the central processor 44.

As will be appreciated by those skilled in the art, the functioning of the various software packages is not greatly changed from that of prior art systems. Xlib is the same library, it merely executes on a different processor. The use of stubs, such as Xlib stub 64, is generally known to those skilled in the art, although not in a context such as the present one. The remainder of the software system, who's structure is shown in FIG. 4, can be easily implemented by those skilled in the art by adapting well known, widely available software to the structure described. This means that the amount of code which must be rewritten to implement the described system is moderate relative to the large performance gains which can be achieved.

Since the significant burden of the details of the X Windows system are offloaded from the central processor 44 to the secondary processor 48, the central processor 44 is capable of supporting a large number of X Windows applications. This allows a system such as computer system 42 to be used centrally to support a large number of X display stations which can be connected over a Local Area Network. This can provide cost savings over the use of a larger number of high cost work stations. In addition, if a high capacity central machine, such as an AS/400, is already available, X applications can be run on X display stations for a low incremental cost by connecting them to an existing network.

The embodiment described above assumes that the central processor and the secondary processor reside in a single computer system and communicate over a system bus. An alternative system arrangement which utilizes the concepts of the present invention provides for the secondary processor to be located in a separate machine from the central processor, possibly at a physically remote location. It will be appreciated by those skilled in the art that the described functional split between the two processors results in a relatively minimal amount of data transferred over the system bus. This result can be used to provide a remotely located secondary processor connected to the central processor by a high speed serial communications link which performs in almost an identical manner to the system described above. In effect, the central and secondary processors operate concurrently with message passing linking their operation, and it does not matter whether the messages are passed over a system bus or a serial link.

This allows, for example, design of a system in which applications are executed on a central mainframe computer and the X display terminals used for input/output are located in a different city. A machine which is connected to the display terminals over a local area network can contain the secondary processor. The secondary processor and mainframe can communicate over a serial link. Since the data transferred between the central processor and the secondary processor is usually significantly less than that transferred between the display terminals and the secondary processor, overall system performance will not suffer too much. This allows a system executing X applications to drive terminals located in many different remote locations, which cannot be done using available prior art systems.

While the invention has been shown in only one of its forms, it is not thus limited but is susceptible to various changes and modifications without departing from the spirit thereof.

What is claimed is:

1. A method for performing input/output between an application executing on a computer system and a graphics display terminal connected to the computer system by a local area network, comprising the steps of:

executing the application on a central processor;

within the application, generating output which is not in a form capable of driving a graphics terminal;

when output is generated by the application, communicating such output to a separate display controller processor within the computer system over a computer system bus;

on said display controller processor, executing graphics display routines for translating generated output into a form capable of driving a graphics terminal;

communicating translated output from the display controller processor to a graphics terminal, over the local area network, for display;

when input is generated at the graphics terminal, communicating the generated input to the display controller processor over the local area network;

on the display controller processor, translating generated input to a form capable of communication to the application; and communicating the translated input to the central processor, over the computer system bus, for use by the application.

2. The method of claim 1, wherein the terminal is responsive to X Window System commands.

3. The method of claim 2, wherein both of said translating steps comprise executing Xlib routines on the display controller processor.

4. The method of claim 3, further comprising the step of:

executing, on the display controller processor, additional procedures which in turn invoke Xlib procedures.

5. The method of claim 4, wherein such additional procedures comprise image processing routines.

6. The method of claim 3, further comprising the step of:

on the graphics terminal, executing an X Windows System window manager client application.

7. The method of claim 1, wherein at least one input event is completely processed on the display controller processor without transferring any information to the central processor.

8. A processing system for controlling graphics terminals over a local area network, comprising:

a central processor within the processing system, for executing application programs, wherein the application programs generate output which is not capable of driving a graphics terminal;

a secondary display controller processor, within the processing system, wherein said display controller processor executes procedures for driving graphics terminals, and for translating output generated by the application programs into a form capable of driving a graphics terminal;

a computer system bus within the processing system for communicating information between said central processor and said display controller processor; and a local area network attachment for connecting said display controller processor to the network, wherein translated output is communicated to a graphics terminal through said local area network connection, and wherein input received from said local area network connection is translated for use by the application programs.

9. The system of claim 8, wherein at least one input event is completely processed in said secondary display controller processor without intervention from said central processor.

10. The system of claim 8, wherein the graphics terminals are responsive to X Windows System commands.

11. The system of claim 10, wherein the procedures executed on said display controller processor comprise Xlib procedures.

12. The system of claim 11, wherein the procedures executed on said display controller processor further comprise graphics procedures which invoke Xlib procedures.

13. The system of claim 11, wherein the procedures executed on said display controller processor further comprise an X Windows System window manager client application.

14. A computer system, comprising:

a first central processor for executing application programs, such application programs performing input/output functions by making procedure calls to a graphics library;

an internal computer system bus connected to the first central processor;

executing on the first central processor, a first interface procedure for receiving the graphics library procedure calls from the application programs and communicating them over the internal computer system bus;

a second central processor, connected to the internal computer system bus, for executing graphics procedures contained in the graphics library, wherein the graphics procedures generate commands for driving graphics terminals;

executing on the second central processor, a second interface procedure for receiving the graphics library procedure calls from the first procedure over the internal computer system bus and invoking the graphics library procedures;

also executing on the second central processor, a third interface procedure for receiving the commands for driving graphics terminals from the graphics procedures and communicating them over a local area network; and at least one graphics terminal connected to the local area network for receiving the commands for driving graphics terminals and displaying graphics in response thereto.

15. The computer system of claim 14, wherein the graphics terminal comprises a computer system executing an X Windows System client application.

16. The computer system of claim 15, wherein the graphics library comprises Xlib.

* * * * *